(12) United States Patent
Lawson et al.

(10) Patent No.: US 7,829,520 B1
(45) Date of Patent: Nov. 9, 2010

(54) AQUEOUS BASED CHEMICAL AND BIOLOGICAL WARFARE DECONTAMINATING SYSTEM FOR EXTREME TEMPERATURE APPLICATIONS

(75) Inventors: Glenn E. Lawson, Springfield, VA (US); Richard C. Hodge, King George, VA (US); Jerry S. Brown, Woodford, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/798,171

(22) Filed: Mar. 10, 2010

Related U.S. Application Data

(62) Division of application No. 11/973,847, filed on Oct. 10, 2007, now Pat. No. 7,718,594.

(60) Provisional application No. 60/854,461, filed on Oct. 11, 2006.

(51) Int. Cl.

| | |
|---|---|
| *C11D 1/66* | (2006.01) |
| *C11D 1/72* | (2006.01) |
| *C11D 1/75* | (2006.01) |
| *C11D 1/825* | (2006.01) |
| *C11D 1/88* | (2006.01) |
| *C11D 9/42* | (2006.01) |
| *A62D 3/00* | (2007.01) |
| *A61L 2/18* | (2006.01) |
| *A61K 33/40* | (2006.01) |
| *C01B 15/00* | (2006.01) |
| *C01B 15/10* | (2006.01) |

(52) U.S. Cl. ............ 510/421; 510/433; 510/483; 510/503; 510/309; 510/310; 510/375; 252/186.25; 252/186.26; 252/186.27; 252/186.42; 252/186.43; 516/53; 516/67; 588/313; 588/318; 588/320; 422/28; 422/29

(58) Field of Classification Search ............ 510/421, 510/433, 483, 503; 252/186.26, 186.27, 252/186.42, 186.43; 588/313, 318, 320

See application file for complete search history.

(56) References Cited

U.S. PATENT DOCUMENTS

| | | | | |
|---|---|---|---|---|
| 3,138,473 | A | * | 6/1964 | Ess et al. ............ 106/162.9 |
| 3,532,703 | A | * | 10/1970 | Morimura et al. ............ 546/20 |
| 4,146,499 | A | * | 3/1979 | Rosano ............ 252/186.32 |
| 5,391,300 | A | * | 2/1995 | Webb et al. ............ 210/670 |
| 6,245,957 | B1 | | 6/2001 | Wagner et al. ............ 588/200 |

(Continued)

*Primary Examiner*—Joseph D Anthony
(74) *Attorney, Agent, or Firm*—Gerhard W. Thielman, Esq

(57) ABSTRACT

The current invention encompasses a microemulsion having environmentally safe components, the microemulsion exhibiting optical clarity and stability over a wide range of temperatures. The microemulsion also forms a part of a decontaminant solution for treating chemical and biological contaminant agents, the solution preferably containing peroxycarboxylic acids generated from solids as the primary decontamination agent. The solution is a single phase emulsion that is both stable and effective over a broad range of temperatures, the range extending well below 0° C. There is also disclosed a microemulsion decontaminate solution having components that stabilize the included solid and peroxycarboxylic acids.

8 Claims, 2 Drawing Sheets

U.S. PATENT DOCUMENTS

| | | | |
|---|---|---|---|
| 6,369,288 B1 * | 4/2002 | Brown | 588/409 |
| 6,436,342 B1 * | 8/2002 | Petri et al. | 422/28 |
| 6,525,237 B1 | 2/2003 | Purdon et al. | 588/200 |
| 6,723,891 B1 | 4/2004 | Wagner et al. | 588/200 |
| 7,064,241 B2 * | 6/2006 | Brown et al. | 588/320 |
| 2003/0045767 A1 * | 3/2003 | Brown | 588/200 |
| 2005/0059566 A1 * | 3/2005 | Brown et al. | 510/375 |
| 2005/0288203 A9 | 12/2005 | Brown et al. | 510/375 |
| 2005/0288204 A1 * | 12/2005 | Matts et al. | 510/375 |

* cited by examiner

AQUEOUS BASED CHEMICAL AND BIOLOGICAL WARFARE DECONTAMINATING SYSTEM FOR EXTREME TEMPERATURE APPLICATIONS

This application is a division of U.S. patent application Ser. No. 11/973,847 filed Oct. 10, 2007, issued as U.S. Pat. No. 7,718,594 and identified as Navy Case 97750, which claims the benefit of U.S. Provisional Patent Application Ser. No. 60/854,461, filed Oct. 11, 2006, and the entirety of both applications are hereby incorporated by reference in this application.

STATEMENT OF GOVERNMENT INTEREST

The invention described herein was made in the performance of official duties by one or more employees of the Department of the Navy and therefore the invention disclosed herein may be manufactured, used, or licensed by or for the Government of the United States for governmental purposes without the payment of any royalties thereon or therefor.

BACKGROUND

1. Field of the Invention

The invention described herein relates to the field of aqueous systems for extreme temperature applications, especially extremely low temperature applications. The disclosed system provides an excellent base for systems for neutralizing or decontaminating chemical and biological contaminants. In this latter aspect, the invention relates to a decontaminant solution suitable for use in a variety of environments against a broad range of chemical and/or biological agents, and more particularly to a system in which the primary decontaminating agent is stabilized to provide a longer useful life.

The current invention provides an aqueous microemulsion base that is stable over a temperature range heretofore unattained, making the microemulsion useful for many applications. In particular, it can be used to provide a broad-spectrum decontaminant solution that is effective and stable over a wide temperature range. The decontaminant likewise is useful against both biological and chemical agents, and utilizes components that are not significantly ecologically disadvantageous. In addition, a means has been found to stabilize the decontaminant component itself, making the decontaminant effective for a period of time longer than that expected of other decontaminants. The current invention thus provides a decontaminant that is relatively harmless to humans and the environment and yet is effective for eliminating contamination on most surfaces.

2. Brief Description of the Art

Emulsions are useful in and of themselves for a variety of uses. Because emulsions by the nature thereof have both lipophilic and hydrophilic properties, they have the capability of "wetting" and thereby dissolving or at least suspending both lipophilic substances such as grease and hydrophilic substances that require a more polar substance for dissolution or suspension. Microemulsions are even more useful in many situations because of the greater boundary layer surface area between the lipophilic and hydrophilic components of the mixture. Because of this "dual" nature of a microemulsion, the microemulsion can be used, for example, as a rinse or wash to solubilize or suspend both polar and nonpolar liquids or other substances.

Contamination by chemical, biological, or radioactive substances, whether intentional or accidental, is of increasing concern in both military and civilian environments. Delivery systems for intentional contamination can be easy to obtain or build and difficult to detect. Also, many types of contaminants degrade only very slowly. Radioactive contamination generally must be physically removed from an area to effect decontamination. Chemical contaminations likewise must be physically removed, e.g., by flushing an area with liquids, and/or must be chemically converted to forms that are less toxic. Biological agents also can be washed away or killed by selected reagents, but many biological agents or forms thereof, i.e., spores, are highly resistant to damage and can persist for long periods of time.

As addressed herein, chemical agents (CA) specifically include but are not limited to vesicants and nerve gases. Vesicants, blistering agents that particularly affect skin and mucous membranes, are exemplified by the sulfur mustard (bis-(chloroethyl)-sulfides, commonly designated as HD), and nitrogen mustard (tris-(2-chloroethyl)-amines, commonly designated as HN-1, HN-2, and HN-3) compounds. The class of vesicants also include Lewisite (L), an arsenoethene compound. Chemical agents also include nerve gases, the better known ones including Tabun (GA) and the phosphonofluoridates, Sarin (GB), and Soman (GD). There is additionally a class of compounds referred to as V compounds that include phosphorylthiocholines such as VX.

Biological agents (BA) primarily consist of bacteria, viruses, and fungi. These agents may be native or engineered, and include such well-known agents as anthrax. Many BAs are relatively vulnerable in the vegetative state, and can be destroyed or otherwise decontaminated through the use of common disinfectants, many of which are relatively harmless to the environment. Many BAs, however, can also exist in the form of spores. Spores can persist for long periods of dormancy, and many are vulnerable only to harsh conditions such as high heat or powerful reagents such as concentrated acids, bases, or other chemicals. Decontamination of many, especially outdoor, areas is difficult or impossible by exposure to harsh conditions, and use of concentrated reagents is often harmful to humans.

Several decontamination solutions and/or compounds have been proposed. One, Decontaminating Solution 2 (DS2) was originally used by the United States Army and contained diethylenetriamine, ethylene glycol mono-methyl ether, and sodium hydroxide. Standardized in 1960, it is no longer actively employed. While effective against CM, this solution is toxic, flammable, and environmentally hazardous. U.S. Pat. No. 6,245,957 proposes another CA decontaminant comprising a carbonate, peroxide, and alcohol mixture. This combination is described as being environmentally safe and effective "in cold weather operations."

A decontamination formulation capable of forming an emulsion is proposed in U.S. Pat. No. 6,525,237, comprising a mixture of hydrated chloroisocyanuric acid, a selected glycol compound, a surfactant, a buffering system to maintain a pH of about 8.5 to 11, and water. In this disclosure it is stated that all of the ingredients can be premixed before being introduced to a pump and/or spraying nozzle for application, although it is preferred that the erosive and corrosive acid and buffer be added at a location after the pump. This solution is stated as being effective against all three contaminant sources by chemically neutralizing CAs, killing BAs, and encapsulating and removing radioactive agents.

A water-in-oil (W/O) microemulsion also including a peroxide/molybdate reactant system is proposed in U.S. Pat. No. 6,723,891 as effective against chemical contaminants. In this case, the microemulsion is comprised of, for example, hydrogen peroxide, a surfactant, and methylene chloride as the oil constituent (which is environmentally harmful), and butanol (as a cosolvent). This W/O microemulsion is stated as being stable in the range of from about −30° C. to about −40° C. and it is preferred to maintain the pH of the solution in the range of from 7 to 12. The drawback to this system, however, is the potential harm to personnel, materials, and the environment due largely to the negative effects of the methylene chloride.

A microemulsion decontaminant is also proposed in U.S. Patent Application Publication Number 2005/0288203. The microemulsion incorporates a solid source of peroxycarboxylic acid, which is effective against chemical agents and against vegetative biological agents. The solution also contains a germinant that causes spore BAs to convert to vegetative states, at which point they become vulnerable to the other components of the microemulsion.

SUMMARY OF THE INVENTION

Each of the foregoing described decontaminants have shortcomings. DS2 presents storage problems, and is harmful to humans and the environment. The compositions disclosed in U.S. Pat. Nos. 6,245,957 and 6,723,891 are described as being effective only against chemical agents. The emulsion described in U.S. Pat. No. 6,525,237 must be maintained at a relatively high pH and admittedly contains erosive and corrosive components. The composition in the cited application utilizes a germinant, which requires that the decontaminant be maintained on a contaminated surface for a time sufficient to achieve germination of spores. DS2 was the only decontaminant approved interium solution for use by the U.S. military that was effective over the temperature range −26° C. to 52° C., but its use has been discontinued. Although, demonstrated to be effective against CAs, its effect on BAs (and especially spores) required extended contact time and may not kill 100% of spores. The replacement approved composition, DF-200, utilizes about 8% hydrogen peroxide and is effective only at temperatures above about the freezing point of water.

There is a need for microemulsions that remain thermodynamically stable over a wide range of temperatures. Also, there is a need to provide a decontaminant that overcomes the various weaknesses of known solutions. Such a decontaminant must be effective against both CAs and BAs, and it is preferred that it have at least some effectiveness in the physical removal of radioactive contamination. The composition must be usable over a broad range of temperatures and it must be stable in its mixed form. Finally, it must be compatible for use with military and first-responder materials and it must not be harmful to either the user or the environment. The disclosed compositions are effective in achieving these goals.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION OF THE INVENTION

Figure 1:
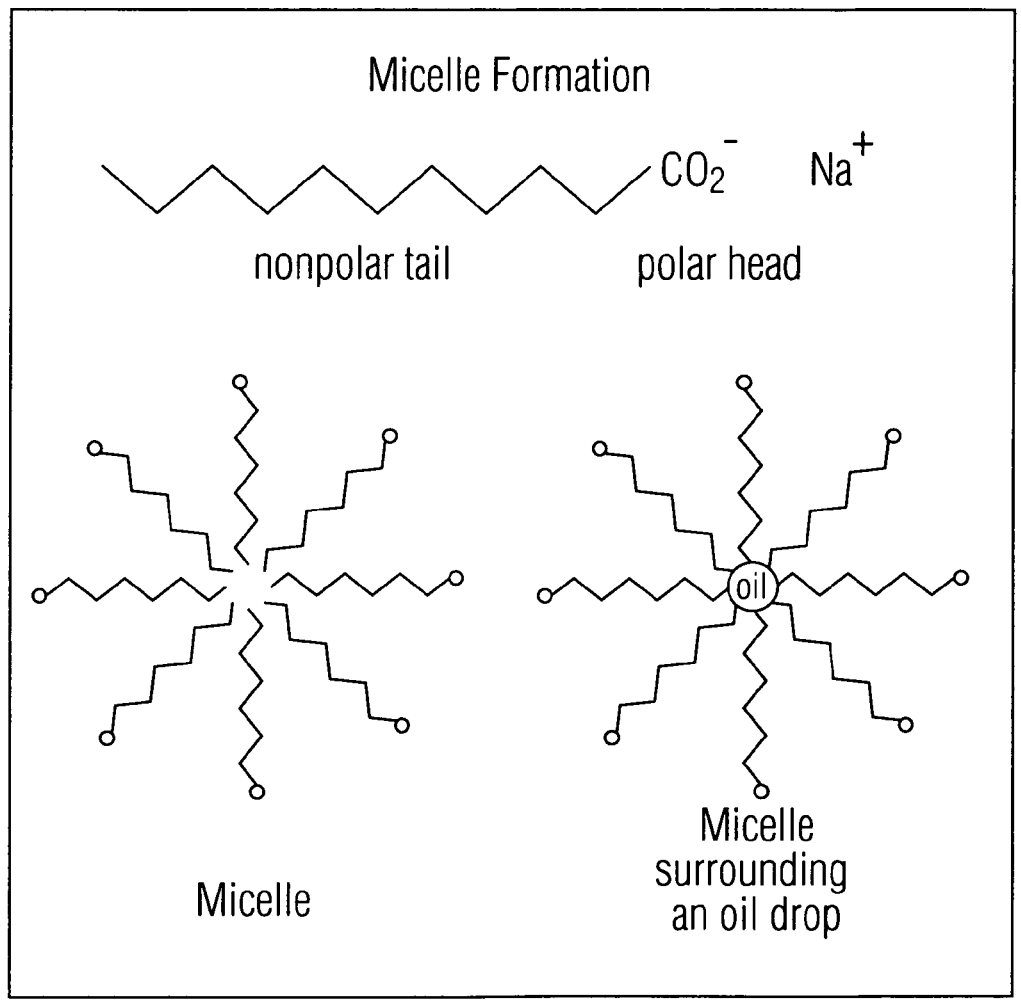
FIG. 1 is a schematic illustrating the structure and function of a micelle formed as part of the claimed invention.

The current invention meets the requirements set forth above by providing a microemulsion that remains physically and chemically stable over a broad range of temperatures so as to be useful in differing temperature environments including those in which the temperatures are below the freezing point of water. The microemulsions of the current invention have been demonstrated to be stable at temperatures up to about 60° C. and have been demonstrated to meet military specifications requiring liquidity and stability at temperatures down to at least −15° C. Moreover, the microemulsions can be used as part of decontaminant systems that incorporate an oxidizing agent into the microemulsion. The oxidizing agent is selected such that the decontaminant is effective against both chemical and biological contaminants. Appropriate selection of the surfactants and emulsion components ensure that the decontaminant will remain effective over a range of temperatures exceeding that range expected of prior aqueous decontaminant systems. The contaminant is stable in its mixed form, enhancing its ease of use. It is further part of this invention to add other components to the decontaminant, as discussed below, that stabilize the oxidizing agent such that the agent remains effective against chemical and biological contaminants for a period of time longer than has been made possible by prior art solutions.

The use of Winsor's methods to formulate and describe microemulsions (μEM) is not new in the art of decontaminant formulations. At least one formulation in the references cited above is referred to as a Winsor II (W/O) or Winsor I (O/W) μEM. Winsor I, an emulsion with two phases, the lower (O/W) microemulsion phase being in equilibrium with the upper excess oil, and Winsor II, an emulsion with two phases, the upper microemulsion phase (W/O) being in equilibrium with excess water, are both two phase dispersions. Windsor III emulsions have both a water and an oil phase in addition to the microemulsion phase, and a Winsor IV emulsion is a single-phase microemulsion. The use of microemulsions has the advantage of enhancing the ability of the formulation to solubilize or at least suspend almost all known CAs and BAs, and to help solubilize, suspend, or encapsulate radioactive particles, whether presented as compounds or elements. A Winsor (IV) microemulsion is a single phase, with oil, water, and surfactant and is preferred because it provides the greatest boundary layer surface area between the lipophilic and hydrophilic components of the emulsion for a given volume, thereby ensuring that even the smallest particles of contaminant are "wetted" by a component most likely to solubilize the specific contaminant.

The advantages of μEMs, however, especially in decontaminant formulations, are many. Decontaminant solutions, by the nature of the purpose thereof, must be ready for use in an "as is" condition, or must be easily mixable and usable by first-responders. ("First-responders" as used herein is intended to mean, collectively but not exclusively, personnel in fire, rescue, and other emergency units both military and civilian.) Despite a significantly high degree of training, first-responders may face a hostile environment and multiple simultaneous duties. This militates against requiring any complex mixing or measuring steps for decontaminant solutions; it is preferred that the decontaminant solution be usable "as is" or with only a minimal requirement of mixing, such as only the addition of water.

In addition, microemulsions by the nature thereof are highly stable at ambient environmental conditions. A microemulsion, especially one used as a base for a decontaminant solution ready for use in the field by first responders, will be subjected to shock and vibration during transportation, and changing temperatures. These environmental conditions alone are not enough to cause a microemulsion to phase separate because of its high thermodynamic stability, but shock and vibration during transport can cause a normal homogeneous mixture to phase separate into a two-phase liquid, where the lipophilic and hydrophilic components separate.

In accordance with the current invention, it has been found that a microemulsion can be formed that will be optically clear and physically and chemically stable at temperatures ranging from at least about −15° C. to at least 60° C. In addition, the constituent elements of the novel microemulsions are not harmful, or only minimally harmful, to materials, personnel, and the environment. As used herein, "optically clear" means that to the observer, the solution appears to be a single-phase formulation. Whether the microemulsions are used as stable aqueous solutions per se or as the base formulation for a decontaminant or other solution, the optically clear feature provides a quick reference to the continued stability of the emulsion. The microemulsions are, of course, heterogeneous on a microscopic level, but appear macroscopically homogeneous. These micro-emulsions are created by appropriate mixing of water, an amphoteric imidazoline derivative surfactant, and ethoxylated tridecyl alcohol. The amphoteric surfactant refers to a broad classification of surfactants. Amphoteric surfactants can be either cationic, zitterionic or anionic, depending on pH. In a preferred embodiment of the current invention, the microemulsion is maintained at a pH of at least greater than 7.0 to maintain the amphoteric surfactant as an anion. A pH of about 8.0 is preferred, ensuring that the anionic nature of the surfactant is maintained but not creating a strongly basic solution that would be deleterious to materials, personnel, or the environment.

The components that form the desired novel microemulsions are water, an amphoteric surfactant, and a polyethoxylated alcohol. While the inventors do not wish to be bound by theory, it is believed that the use of the polyethoxylated alcohol provides the unexpected breadth of the temperature range and the amphoteric surfactant, especially when maintained as an anion, provides enhanced stability. It is further believed that a broad range of amphoteric surfactants can be used so long as the surfactant can be maintained in an anionic condition. Preferably, the amphoteric surfactant is dimethyldecylamine oxide (available, e.g., as Barlox 10S dimethyldecylamine oxide) or sodium capryloamphopropionate (available, e.g., as Mackam CYSF capryloamphopropionate). The preferred polyethoxylated alcohol is polyethoxylated-(6)-isotridecyl alcohol (available, e.g., as Renex 36).

When the amphoteric surfactant is dimethlydecylamine oxide (herein, DMDA-O), a preferred microemulsion contains, by weight, 10-90% water; 1-40% DMDA-O, and 1-40% polyethoxylated-(6)-isotridecyl alcohol. A more preferred microemulsion is made, by weight, of 30-80% water, 1-20% DMDA-O, and 1-15% polyethoxylated-(6)-isotridecyl alcohol. A most preferred micro-emulsion consists of, by weight, 60-75% water, 5-15% DMDA-O, and 1-15% polyethoxylated-(6)-isotridecyl alcohol. For each composition, an amount of NaOH or other compatible base is added to bring the composition to a pH of at least greater than 7.0. The exact ratios of all of the constituents can be selected as known by those of skill in the art to optimize the resulting microemulsion for particular uses.

When the amphoteric surfactant is sodium capryloamphoproprionate, a preferred microemulsion according to the current invention consists of, by weight, 10-90% water, 10-50% sodium capryloamphoproprionate, and 1-40% polyethoxylated-(6)-isotridecyl alcohol. A more preferred microemulsion contains, by weight, 30-80% water, 10-25% sodium capryloamphoproprionate, and 1-20% polyethoxylated-(6)-isotridecyl alcohol; and a most preferred microemulsion contains, by weight, 60-75% water, 10-15% sodium capryloamphoproprionate, and 1-15% polyethoxylated-(6)-isotridecyl alcohol. Again, an amount of NaOH or other compatible base is added to these constituents such that the composition has a pH of at least greater than 7.0.

The microemulsions made according to the current invention are useful because they are fluid and stable solutions over the disclosed temperature range. The constituents are environmentally friendly and require no special handling. The microemulsions can be used in almost any situation requiring application of a liquid, for example, for de-icing. Those of skill in the art will be aware of additional constituents that can be added for particular purposes without altering the thermodynamic stability of the microemulsion.

The microemulsions can also serve, alone or with the addition of other constituents, as a cleaning or rinsing solution. Because of the stability of the microemulsion, freezing of the cleaning or rinsing solution before, during, or after use is avoided over the stated temperature range, at least until the microemulsion is so contaminated with solutes and/or suspended particles that the foregoing ratios are significantly altered outside the stated ranges.

Another aspect of the current invention is to provide a decontaminant for chemical and biological warfare agents, the decontaminant having the advantages of the disclosed microemulsions. Such a decontaminant is a significant improvement over existing solutions in that it remains a stable liquid over a wide temperature range, the lower portion of which exceeds the low temperature capabilities of other decontaminants known to the art while consisting of non-hazardous components.

To provide a decontaminant solution that is usable "as is" in the form of a microemulsion is difficult. Careful selection of the components of the microemulsion itself is necessary to create an emulsion that is stable for a reasonable period of time and over a reasonable range of temperatures. This task is even more difficult in the case of decontaminants, because the composition must also contain, in a stable manner, the relatively strong additional components ("oxidizers") necessary to neutralize or destroy the chemical or biological threat. (As used herein, such components as are added to decontaminant solutions for the purpose of achieving a chemical or biological neutralization or destruction of a contaminant are referred to generically as "oxidizers," which term is not intended to exclude other such components as are known decontaminants in the art whether such are formally and/or chemically classed or function as oxidizers or not.) The selected oxidizers known in the art have a strong tendency to lose strength over a relatively short of time, either by themselves or by the requirement of buffering and other constituents required to create or maintain the decontaminant effectiveness of the oxidizer.

One oxidizer known to be effective against both chemical and biological contaminants is peracetic acid (PAA). PAA is described in U.S. Pat. No. 6,369,288 and both that patent and this application are assigned to the same entity. The effectiveness of PAA against chemical agents is shown by the results of Table 1:

TABLE 1

Chemical Agent Efficiency of PAA
Decontamination Efficiency of 0.1 M Chemical Agent by 0.3 M PAA,
Mixed Sulfonate µEM buffered to pH = 10,
In Percent CA Neutralized

| Reaction Time in Minutes | HD | GD | VX |
|---|---|---|---|
| 0 | 0.00 | 0.00 | 0.00 |
| 15 | 98.21 | 99.99 | 98.39 |
| 30 | 98.31 | 99.99 | 98.58 |
| 60 | 99.15 | 99.99 | 98.72 |

Using PAA is advantageous for several reasons. It is a strong enough oxidizer to neutralize or destroy CA's and BA's, and does not create toxic by products: excessive oxidation of VX can produce EA-2192 and excessive oxidation of HD can produce the sulfone derivative. PAA, like peracids in general, is environmentally friendly because its breakdown products are water and a weak acid. PAA is effective at moderate pH, meaning that it and its use are compatible with (i.e., not corrosive to) many tested military materials. The fact that the pH is moderate, rather than strongly basic or acidic, also means that (1) there is no need to include as a constituent a strong acid or base or equivalent buffering system and (2) after use in the field, there is no need for a neutralizer to be applied to the decontaminated object or area.

The PAA used to produce the results set forth in Table 1 was a commercially available solution in which PAA was present at 15% by volume. Commercial grades of PAA are disadvantageous for use in decontamination systems, however. These commercial grades typically are mixtures of acetic acid, hydrogen peroxide, PAA, stabilizing agents, and water. As is known, the breakdown products of hydrogen peroxide are water and molecular oxygen. Thus, when commercial grade PAA is mixed with a decontamination solution, there invariably results foaming and offgassing.

PAA is useful as an oxidizer in the microemulsion disclosed herein when present with the other components of the microemulsion in the range of from about 5 to about 50% by weight; more preferably from about 5 to about 20% by weight; and most preferably in the range of from about. 15 to about 20% by weight. The foregoing disadvantages of PAA are, however, undesirable. A more effective way of providing an oxidizer is needed.

In accordance with the current invention, the problems associated with the use of PAA mixtures as the oxidizer for a decontaminant are avoided through the use of peracetyl borate (PAB). The synthesis of PAB is disclosed in U.S. Pat. No. 5,462,692, wherein PAB is disclosed as a solid for use in compositions for washing, bleaching, and disinfecting.

Figure 2:
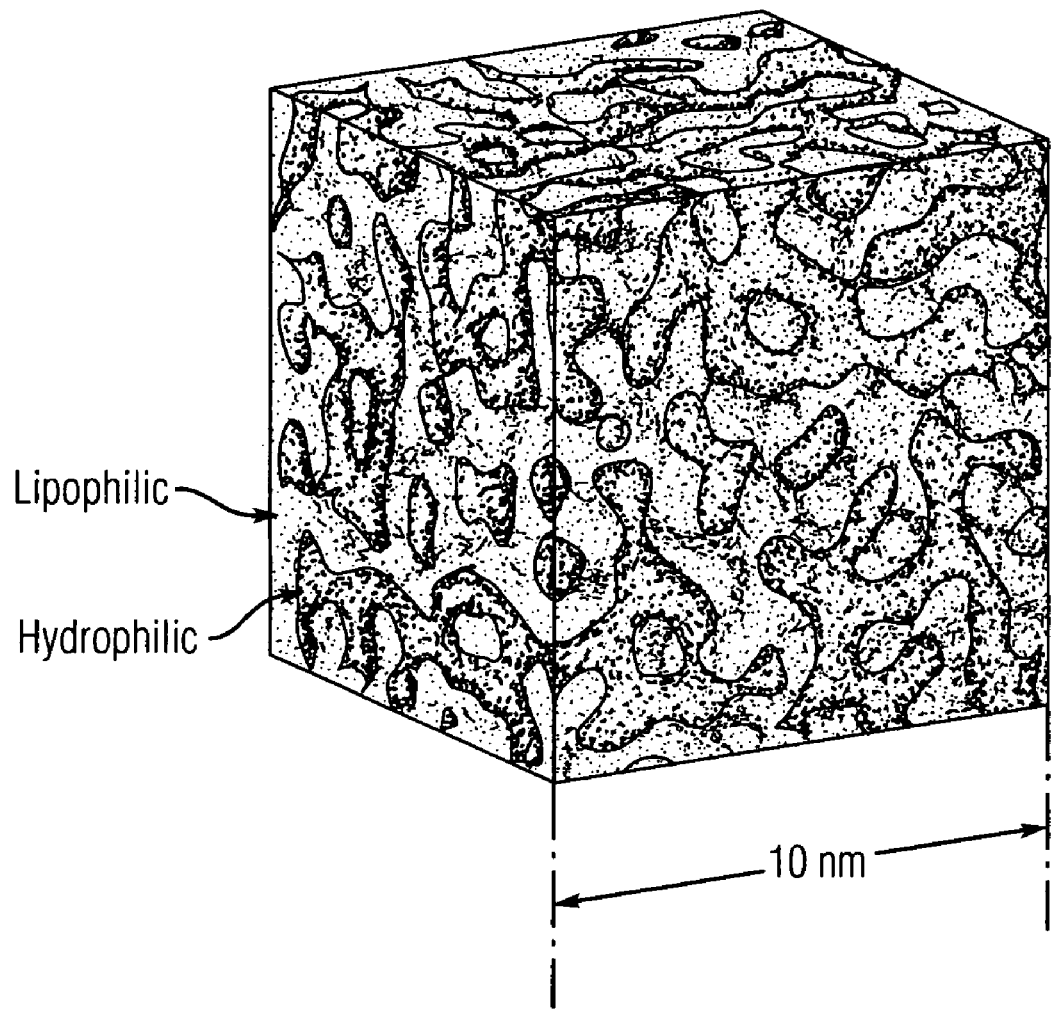
FIG. 2 is a scale illustration of the microemulsion of the current invention, the illustration depicting a cube 10 nm on a side.

When mixed with the microemulsion disclosed above, PAB provides an oxidizer suitable for use in neutralizing CAs and BAs. The oxidizer is not so powerful as to excessively oxidize the chemical agents VX and HD as discussed above, but is powerful enough to neutralize chemical agents and to serve to at least neutralize biological agents. Indeed, tests of the microemulsion decontaminant solution as set forth herein shows that the solution can perform as a biological sterilant, that is, it eliminates microbial life in the inanimate environment, including all forms of vegetative bacteria, bacterial spores, fungi, fungal spores, and viruses. This unforeseen efficiency of the solution provides advantages in a decontaminant not hitherto achieved. In accordance with various exemplary embodiments, FIG. 1 shows structures for micelle formulation; and FIG. 2 shows an isometric microscopic view of the lipophilic and hydrophilic components mixed within the emulsion.

In addition to the high efficacy of the disclosed solution as a chemical and biological decontaminant solution, it has also been found that the solution is stable over a greater temperature range than the disclosed μEM alone. Testing of one preferred disclosed solution showed that the solution remained in a stable liquid state over the temperature range of from about −40° C. to about 60° C. Thus, the disclosed solution can be used in temperature conditions under which known emulsions would either freeze, at the lower end of the range, or begin to separate into constituent components, at the higher end of the range. Liquidity and stability over this range also means that this solution meets military specifications for decontaminant solutions.

The use of PAB in the low temperature microemulsion disclosed herein provides a ready-to-use, stable decontaminant solution. It has also been found that this combination provides an advantageous shelf-life even in low temperature environments. PAB, while having the advantages of greater stability without the consequent offgassing and foaming of PAA, also has a definite shelf-life, inasmuch as it will eventually degrade in an aqueous environment. It has further been found, however, that this degradation can be stabilized by the inclusion in the solution of ethylenediaminetetraacetate (EDTA) or a glycerol such as propylene glycol. While the mechanism of the stabilization has not been clearly defined (and the inventors do not intend to be bound by a theory), it is believed to depend at least in part on the presence in these substances of the OH⁻ groups. When EDTA is used as the stabilizer, it should be present in the solution in the range of about 5 to about 10% by weight; glycerol should be present in the range of from about 20 to about 30% by weight.

Finally, it is known that peroxycarboxylic acids such as PAA are most effective against CAs and BAs at basic pH ranges. It is therefore also an aspect of the current invention to include in the decontaminant solution an amount of NaOH or other suitable base. Addition of NaOH to the disclosed decontaminating solution creates a buffer, and only enough is added to maintain a pH of at least over 7.0 to maintain the anionic nature of the amphoteric surfactant. Unlike other decontaminants in the prior art, however, which require pH values of 10 or more basic, the decontaminant solution of the current invention need be buffered only to a pH range of from about at least over 7.0 to about 9.0, and more preferably from about pH 7.5 to about 8.0.

While the component ranges provided herein can comprise an almost unlimited number of formulations, two particular formulations have been made and tested, as follows:

| Weight % | Component |
|---|---|
| | Formulation A: |
| 16.8 | PAB |
| 24.3 | 3 Molar NaOH solution (for pH adjustment) |
| 23.7 | Water |
| 7.5 | EDTA |
| 23.3 | Sodium Capryloamphopropionate surfactant |
| 4.3 | Polyethoxylated-(6)-isotridecyl alcohol |
| | Formulation B: |
| 17.1 | PAB |
| 17.8 | 3 Molar NaOH solution (for pH adjustment) |
| 13.7 | Water |
| 21.3 | Propylene glycol |
| 28.1 | Dimethyldecylamine oxide surfactant |
| 2.0 | Polyethoxylated-(6)-isotridecyl alcohol |

In the foregoing formulations, the amphoteric imidazoline derivative surfactant is McIntyre Mackam CYSF, the polyethoxylated (6) tridecyl alcohol is Uniqema Renex 36, and the dimethyldecylamine oxide surfactant is Lonza Barlox 10S. Formulation B was specifically found to be an optically clear, stable composition to a temperature down to −40° C. Both of these formulations were tested against dibutyl sulfide (DBS), which is a standard test substance for efficacy of a decontaminant against the H-class chemical agents. The test results are shown in Table 2:

TABLE 2

Chemical Agent Simulant Efficiency
Decontamination Efficiency Formulation A at pH = 7.5-8.0
Against H-Simulant DBS (0.1 M) at Indicated Temperatures

| Reaction Time in Minutes | 20 °C. | −6° C. | −15° C. |
|---|---|---|---|
| 0 | 0.0 | 0.0 | 0.0 |
| 5 | 100.0 | 100.0 | 100.0 |

The Formulation A solution was also tested against the actual chemical agents at ambient temperature to ensure the validity of the low temperature testing. These results are shown in Table 3:

TABLE 3

Chemical Agent Efficiency
Decontamination Efficiency of Formulation A at pH = 7.5-8.0
Against Chemical Agents in Percent Agent Neutralized

| Reaction Time in Minutes | HD | GD | VX |
|---|---|---|---|
| 0 | 0.0 | 0.0 | 0.0 |
| 15 | 100.0 | 100.0 | 100.0 |

The Formulations A and B were also tested against the biological agent *Bacillus anthracis* in the spore form to determine efficacy of decontamination against spores. The concentration of the spores, in colony forming units (CFU) per milliliter (mL) was measured before exposure to the solution. After exposure, the reduction in CFU's was measured, giving the results set forth in Table 4:

TABLE 4

Biocidal Efficiency
Reduction in *Bacillus anthracis* Spores After 15 Minute
Exposure to Candidate Solution (Formulation A, Formulation B)

| | Initial CFU/mL | Reduction, CFU/mL |
|---|---|---|
| *B. anthracis* - Δ Sterne | $2.62 \times 10^7$ | $2.62 \times 10^7$ |
| *B. anthracis* - Vollum 1B | $9.60 \times 10^7$ | $9.60 \times 10^7$ |
| *B. anthracis* - Ames | $2.94 \times 10^7$ | $2.94 \times 10^7$ |

These results indicate that the solutions are not only effective biocides but, within the limits of detection, are sterilants. Given the efficacy of the solutions against spores, the efficacy against less hardy forms, such as vegetative state bacteria, fungi, and viruses, can be assumed readily by those of skill in the art.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A decontaminant solution comprising:
    5-50% by weight of a peroxycarboxylic acid;
    10-90% by weight of water;
    10-50% by weight of an amphoteric imidazoline derivative surfactant; and
    1-40% by weight of ethoxylated tridecyl alcohol.

2. The decontaminant solution according to claim 1, further comprising:
    5-30% by weight of a sodium hydroxide solution, said solution being present in an amount sufficient to maintain said decontaminate solution at a pH in the range of about 7.5 to about 9.0.

3. The decontaminant solution according to claim 1, further comprising:
    5-30% by weight of a base; and
    5-20% by weight of a stabilizer.

4. The decontaminant solution according to claim 2, wherein the peroxycarboxylic acid is generated from perborate.

5. The decontaminant solution according to claim 1, wherein said solution comprises:
    5-20% by weight of peroxycarboxylic acid;
    10-25% by weight of water;
    15-35% by weight of an amphoteric imidazoline derivative surfactant; and
    1-15% by weight of ethoxylated tridecyl alcohol.

6. A decontaminant solution for neutralizing chemical and biological contaminants, said solution comprising:
    15-20% by weight of a peroxycarboxylic acid;
    10-25% by weight water;
    20-30% by weight of an amphoteric surfactant;
    1-5% by weight of ethoxylated tridecyl alcohol;
    17-25% by weight of a basic buffer solution; and
    a stabilizer, said stabilizer selected from the group consisting of EDTA in the range of 5-10% by weight and glycerol in the range of 20-30% by weight.

7. The decontaminant according to claim 6, wherein the amounts of said amphoteric surfactant and said ethoxylated tridecyl alcohol are selected such that said decontaminant is optically clear.

8. The decontaminant according to claim 7, wherein said decontaminant is optically clear and stable over the range of temperatures from about −40° C. to about 60° C.

* * * * *